(12) United States Patent
Bauchot et al.

(10) Patent No.: US 11,258,739 B2
(45) Date of Patent: Feb. 22, 2022

(54) SYSTEM AND METHOD FOR MANAGING FILES TO BE ATTACHED TO OR DETACHED FROM AN ELECTRONIC MAIL

(71) Applicant: Kyndryl, Inc., New York, NY (US)

(72) Inventors: Frederic Bauchot, Saint-Jeannet (FR); Beatrice Coulomb, Cagnes sur mER (FR); Gerard Marmigère, Drap (FR); Carole Truntschka, Saint-Laurent-du-Var (FR)

(73) Assignee: Kyndryl, Inc., New York, NY (US)

( * ) Notice: Subject to any disclaimer, the term of this patent is extended or adjusted under 35 U.S.C. 154(b) by 117 days.

(21) Appl. No.: 16/548,066

(22) Filed: Aug. 22, 2019

(65) Prior Publication Data

US 2020/0053032 A1 Feb. 13, 2020

Related U.S. Application Data

(63) Continuation of application No. 15/496,369, filed on Apr. 25, 2017, now Pat. No. 10,581,776, which is a continuation of application No. 15/008,131, filed on Jan. 27, 2016, now Pat. No. 9,660,946, which is a continuation of application No. 11/949,447, filed on Dec. 3, 2007, now Pat. No. 9,276,885.

(30) Foreign Application Priority Data

Dec. 19, 2006 (EP) ..................................... 06301267

(51) Int. Cl.
*G06F 17/00* (2019.01)
*H04L 51/08* (2022.01)
*H04L 51/42* (2022.01)
*G06F 3/04847* (2022.01)

(52) U.S. Cl.
CPC .......... *H04L 51/08* (2013.01); *G06F 3/04847* (2013.01); *H04L 51/22* (2013.01)

(58) Field of Classification Search
CPC ..... G06F 3/04847; H04L 51/08; H04L 51/22; G06Q 10/10
See application file for complete search history.

(56) References Cited

U.S. PATENT DOCUMENTS 5,922,054 A 7/1999 Bibayan
6,035,326 A 3/2000 Miles et al.
(Continued)

FOREIGN PATENT DOCUMENTS

JP 2003122689 A 4/2003

OTHER PUBLICATIONS

Notice of Allowance issued in a related U.S. Appl. No. 15/496,369.
(Continued)

*Primary Examiner* — Greta L Robinson
(74) *Attorney, Agent, or Firm* — Scully, Scott, Murphy & Presser, PC; Erik Swanson, Esq.

(57) ABSTRACT

A system and method for identifying specific locations where to attach or detach e-mail attachments based on e-mail storage locations is disclosed. The method allows to search in a mail-attachment connection table all the attachment locations that are in relation to the e-mail where the attachment is to be attached to or to be detached from and to present to a user all attachment locations that have a relevance for the attach/detach operation.

20 Claims, 7 Drawing Sheets

(56) References Cited

U.S. PATENT DOCUMENTS

| | | | |
|---|---|---|---|
| 6,351,763 B1 | 2/2002 | Kawanaka | |
| 6,360,252 B1 | 3/2002 | Rudy et al. | |
| 6,505,236 B1 | 1/2003 | Pollack | |
| 6,915,333 B2 | 7/2005 | Delia et al. | |
| 7,089,286 B1 | 8/2006 | Malik | |
| 7,113,948 B2* | 9/2006 | Jhingan | H04L 51/08 |
| 7,133,897 B1 | 11/2006 | Tran | |
| 7,203,749 B2 | 4/2007 | Hiraga | |
| 7,257,639 B1 | 8/2007 | Li et al. | |
| 7,293,006 B2* | 11/2007 | Beckius | G06Q 10/107 |
| 7,375,840 B2 | 5/2008 | Buschi et al. | |
| 8,260,861 B1 | 9/2012 | Bruno et al. | |
| 9,276,885 B2 | 3/2016 | Bauchot et al. | |
| 9,660,946 B2 | 5/2017 | Bauchot et al. | |
| 2001/0054073 A1 | 12/2001 | Ruppert et al. | |
| 2003/0126214 A1 | 7/2003 | Oliszewski | |
| 2003/0126259 A1* | 7/2003 | Yoshida | H04L 51/14 709/225 |
| 2003/0182331 A1 | 9/2003 | Demsky et al. | |
| 2004/0158607 A1 | 8/2004 | Coppinger et al. | |
| 2005/0004989 A1 | 1/2005 | Satterfield et al. | |
| 2005/0192966 A1 | 9/2005 | Hilbert et al. | |
| 2006/0026236 A1 | 2/2006 | Scian et al. | |
| 2006/0095527 A1 | 5/2006 | Malik | |
| 2006/0168012 A1 | 7/2006 | Rose et al. | |
| 2007/0143425 A1 | 6/2007 | Kieselbach et al. | |
| 2007/0180035 A1 | 8/2007 | Liu et al. | |
| 2008/0147746 A1 | 6/2008 | Bauchot et al. | |
| 2016/0219005 A1 | 7/2016 | Bauchot et al. | |
| 2017/0230319 A1 | 8/2017 | Bauchot et al. | |

OTHER PUBLICATIONS

"ZipLip: Attachment Management R4", (product brochure), ZipLip, Inc. (1999-2004).

\* cited by examiner

| FOLDIR | FOLDER #1 | ... | FOLDER # | ... | FOLDER #F |
|---|---|---|---|---|---|
| DIRECTORY#1 | | | | | |
| ... | | | | | |
| DIRECTORY#J | | | FOLDIR(I,J) | | |
| ... | | | | | |
| DIRECTORY#D | | | | | |

FIG. 3

SYSTEM AND METHOD FOR MANAGING FILES TO BE ATTACHED TO OR DETACHED FROM AN ELECTRONIC MAIL

CROSS REFERENCE TO RELATED APPLICATIONS

This application is a continuation of copending U.S. patent application Ser. No. 15/496,369, filed Apr. 25, 2018, which is a continuation of U.S. patent application Ser. No. 15/008,131, filed Jan. 27, 2016, which is a continuation of U.S. patent application Ser. No. 11/949,447, filed Dec. 3, 2007. The entire contents and disclosures of U.S. patent application Ser. Nos. 15/496,369, 15/008,131 and 11/949,447 are hereby incorporated herein by reference.

FIELD OF THE INVENTION

The present invention relates generally to the field of computer-based mail or electronic mail, and more particularly, to a system and method for managing attachment/detachment of files embedded within mails.

BACKGROUND OF THE INVENTION

There are many software applications capable of attaching copies of files to electronic mails (or e-mails). Examples of such software systems include, but are not limited to, electronic mail systems, database systems, as well as collaborative systems such as Lotus Notes™ (Lotus Notes is a registered trademark of Lotus Development Corporation). Anything that can appear as a file somewhere in hard disk folders can be included as an attachment to an e-mail. Attachments can be made of images, word-processing documents, database files, spreadsheets, audio files, executable programs, etc.

Once a file is attached to an e-mail, the whole can be transmitted over a communications network (e.g., the Internet) to other computer systems. Multiple users can access the attached file using suitable collaborative software, typically over a computer communications network. Using conventional software, files attached to e-mails can be operated in several ways. For example, on Lotus Notes™ an attached file can be viewed with a file viewer, launched or processed by another application, or detached from the e-mail and stored to process the file locally or, as in the case of a program file, to be executed.

To detach a file from an e-mail and create a local copy of the attached file, the user typically (as in Lotus Notes™), highlights the file to be detached, selects a detach option, and interacts with a "file save" interface by means of which the user must specify a filename for the local copy of the attached file and the location (i.e., the folder or directory path) to which the file must be detached. This process can be tedious for the user, mainly when multiple files are to be detached. Although some systems enable multiple attachments to be detached simultaneously, each of the attachments must be detached to the same directory despite the type of attached file or the intended use of the attached file. Additionally, conventional systems first query the user as to where the user would like the attached files to be detached.

To illustrate the need for improving current systems and methods for attaching and detaching files to and from e-mails, one may consider the scenario of creating a repository of files detached from e-mail on a personal computing system. In the course of one year, hundreds of files may be typically received by a user, included on attachments of e-mail received from many different senders. Files received by the user can be of all types (i.e., images, pictures, maps, presentation materials, word-processing documents, database files, spreadsheets, MP3 or video files, executable programs, and so) and can be related to quite different categories, subjects, topics or sub-topics (e.g., family pictures, a project documentation, folk music, medieval art, and so). Those files are usually detached by the user, and stored on folders, from where occasionally, they may be accessed by the user, reviewed and attached to new documents, or to outgoing e-mail, being redistributed to many people.

When a user needs to detach a file from an e-mail, if the file is related to a new topic, for which there is not yet a specific folder created beforehand to which save the file, the user is faced with the tasks of identifying and assigning a new category (and sometimes, one or more sub-categories) to the received file, of naming the new category (and other sub-categories, if defined), and then of creating the corresponding directory (and other required sub-directories) on the file system of the user's computer before saving the attached file in the corresponding folder.

At any time, the user should be assisted in the selection of the final directory/folder where to attach or detach those files. Moreover, when a user receives files attached to e-mails, it would be of the utmost importance for the user to automate the process of having those files saved in e-mails related folders.

Then, there is a need for automating the process for saving files detached from e-mails to locations related to the saving locations of the corresponding e-mails.

More generally, a need has arisen for a system and method for automating the process of attaching and detaching file attachments to/from e-mails.

SUMMARY OF THE INVENTION

Therefore, it is an object of the present invention to provide a system and a method which overcome the above issues of the prior art.

It is a broad object of the invention to automate the process of attaching and detaching e-mails attachments.

It is another object of the invention to provide a system and method for identifying specific locations where to attach or detach e-mails attachments based on e-mails storage folders.

It is still another object of the invention to automate the process for defining default saving locations for e-mails attachments.

According to the invention there is provided a system and method for managing e-mail attachments. Specific locations where to attach or detach e-mails attachments based on e-mails storage locations are identified. The method allows to search in a mail-attachment connection table all the attachment locations that are in relation to the e-mail where the attachment is to be attached to or to be detached from and to present to a user all attachment locations that have a relevance for the attach/detach operation.

According to a first embodiment, a method for managing electronic mail file attachments comprises the steps of: receiving a request from a user to attach or detach a file attachment from an electronic mail; identifying a mail location where to file said electronic mail; searching in a mail-attachment connection table for all attachment locations linked to the identified mail location; and extracting at least one attachment location among the found all attachment locations.

According to a further aspect of the present invention, a computer program product stored on a medium readable by a computer machine is disclosed. The computer program product tangibly embodies readable program means for causing the computer machine to perform a method of managing e-mail attachments.

Finally, a machine-readable storage is disclosed. The storage has stored thereon, a computer program having a plurality of code sections executable by a machine, wherein a first plurality of said code sections causing the machine to perform the steps of an attaching method when executed on the machine and a second plurality of said code sections causing the machine to perform the steps of a detaching method when executed on the machine.

BRIEF DESCRIPTION OF THE DRAWINGS

FIG. 3 illustrates a Folder/Directory linking table according to a preferred embodiment of the present invention;

FIG. 6a shows a standard user interface to select a file directory while

DETAILED DESCRIPTION OF THE PREFERRED EMBODIMENT

As previously mentioned, the present invention allows for identifying in an electronic mail system relevant file directories where to attach or detach file attachments.

As illustrated hereinafter, the invention is easy to implement as only the client mail application (called the "User Agent" in the SMTP environment) of the sender is modified. Thus, the implementation remains transparent for: the mail server application; and the local Mail Transfer Agent, in charge of transferring electronic mail messages over the network according to SMTP; and for the client mail application of the recipient.

A preferred environment to operate the invention is based on the SMTP protocol. Generally speaking, a message store agent (MSA) collects incoming mail and places it in a message storage device (Mailbox). A mail user agent (MUA) reads the messages stored in the message storage device and presents an interface to an external user. When the user wishes to transmit mail, the message is composed using the MUA and passed to a message transfer agent (MTA) that insures the mail is correctly addressed and packaged for transport on a communication network.

Some variations may exist with different electronic mail systems that may include a mail sent to devices that are intermittently connected to the network. In such systems, the MUA is replaced with a mail server that services requests over an intermittent line from a mail proxy device. At the request of the mail proxy device, a copy of the mail in the message storage device is copied to a storage device of an off-net machine. The mail server then proceeds in a similar manner to that described above and the elements in the mail server, including the message storage device and the MTA function as previously described.

Outgoing mail may be formatted for delivery on the off-net machine and delivered via mail proxy to the mail server for delivery to the communication network. Transactions between the off-net machine and the mail server on a machine that is continuously on the network occur only when the connection is active. However, whatever the mail system, the present invention operates similarly.

Figure 1:
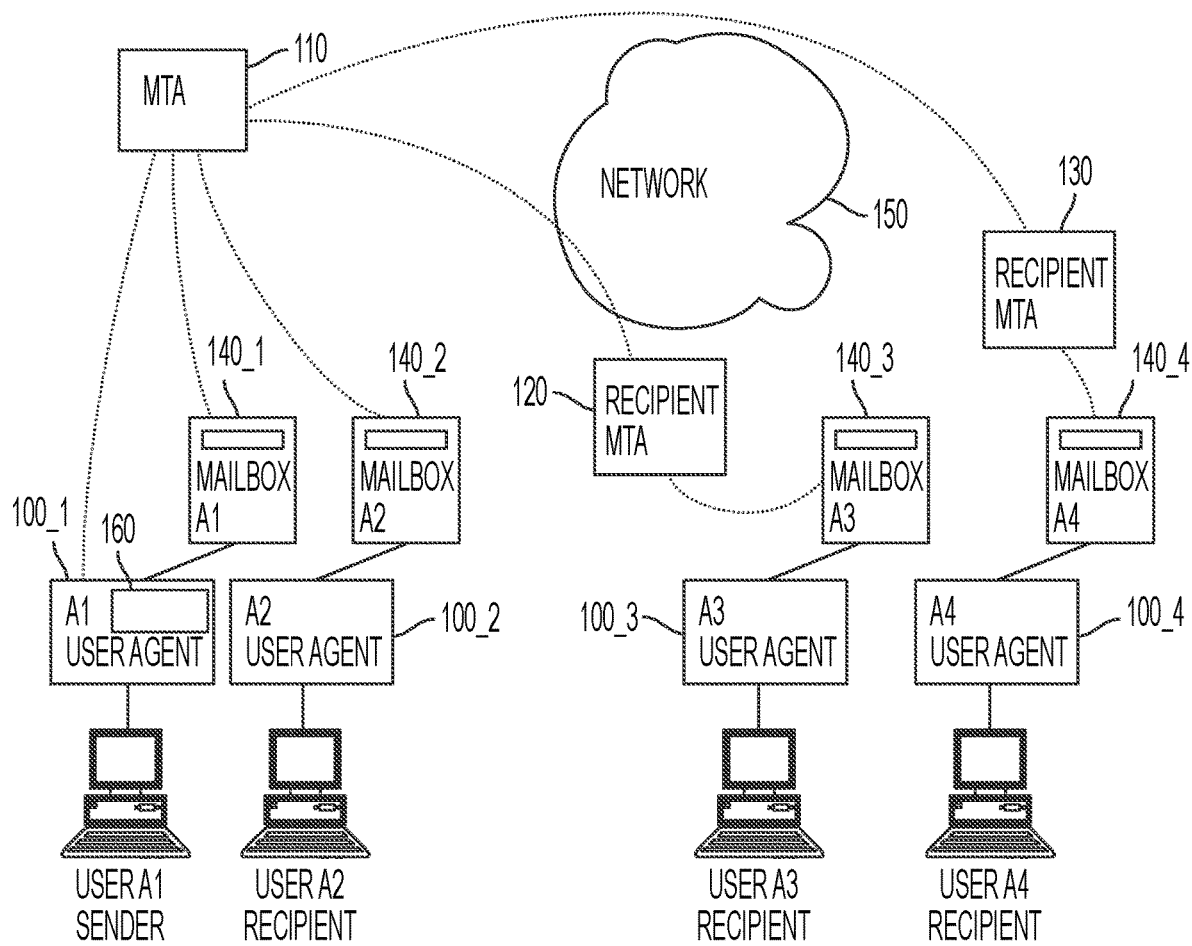
FIG. 1 illustrates the computing environment to operate the method of the invention according to a preferred embodiment.

As shown in FIG. 1, User Agents A1, A2, A3, A4 (all denoted as respective agents 100-1, 100-2, 100-3 and 100-4) operating in users' workstation act as clients for their respective mail servers (110, 120, 130) (the so called Mail Transfer Agents MTAs). In the present example, User Agents A1 and A2 are connected to a local common MTA (110) while User Agents A3 and A4 are each connected to a respective MTA (120, 130). The MTAs are in charge of managing the recipient mail addresses for sending and receiving mails either to or from the local User Agents. The local User Agents (A1, A2) are connected to the local MTA (110) which is connected over the Internet network (150) to remote MTAs (120, 130). The remote MTAs transfer and receive mails either to or from the local User Agents (A3, A4) connected to them.

A User Agent sends a mail to its local MTA. This mail comprises the data itself and the names of the recipients. To deliver a mail to a local User Agent, a MTA looks for the addresses of the recipients and puts the mail in a mail repository (denoted as respective mailboxes 140-1, 140-2, 140-3 and 140-4) of the respective User Agent receiving the mail. The sender and recipient names correspond to the mailboxes of the senders and recipients.

According to a preferred embodiment of the present invention, a specific attach/detach block function (160) is added to the mail client application (100). It is to be noted that for simplification purposes, only one such attach/detach block function is shown in FIG. 1, but each User Agent may comprise its own function. By means of this additional function, a user is offered assistance for identifying a location where it is relevant to attach or detach an attachment while sending or receiving a mail.

Figure 2:
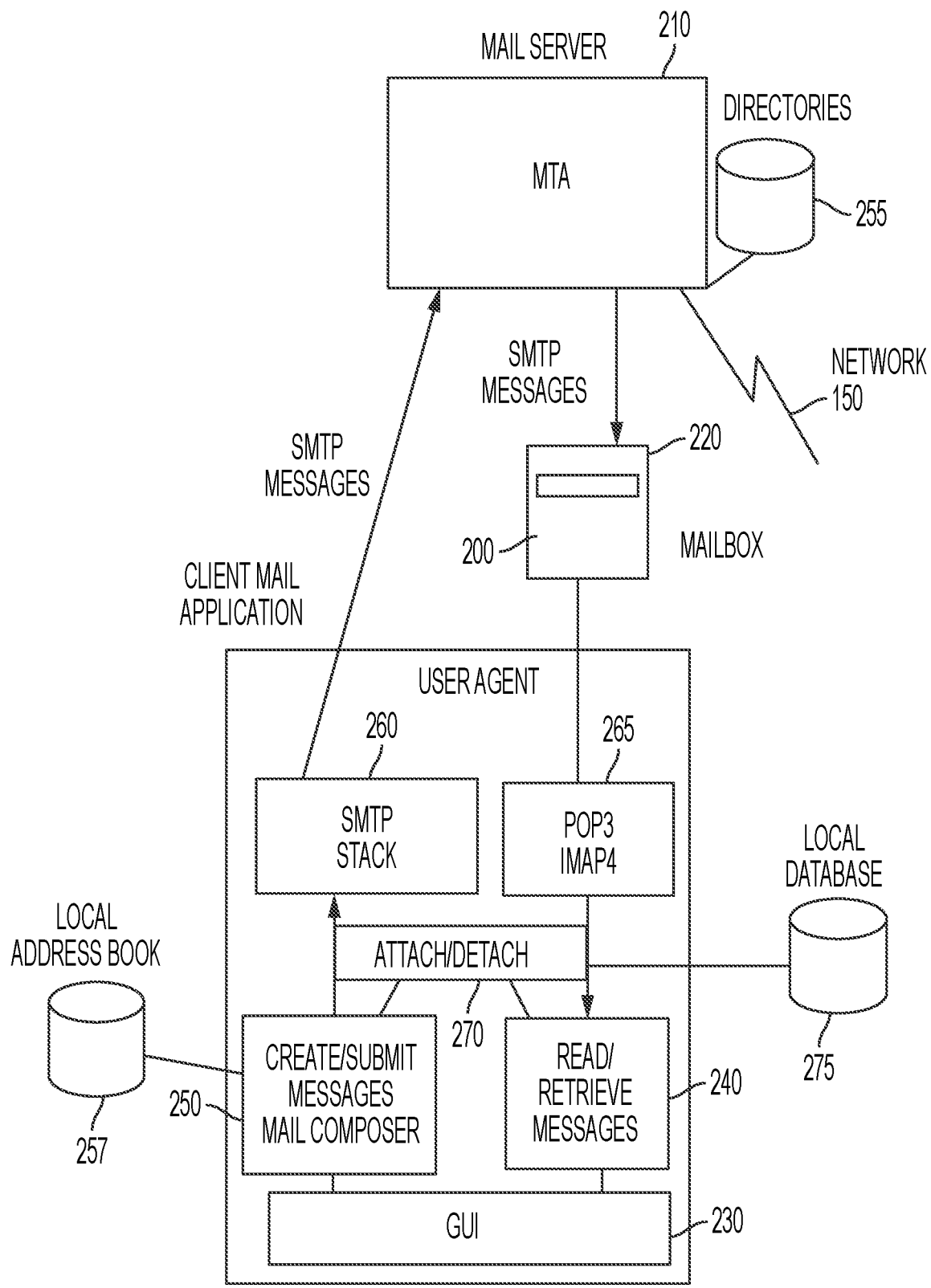
FIG. 2 is a logical view of a client mail application according to the invention.

Referring now to FIG. 2, details of a mail user agent 100 comprising the attach/detach block function are explained. The mail user agent is comprised of several block functions including "create/submit messages" function (250), a SMTP stack 260, "read/retrieve messages" function (240), "attach/detach" function (270), and a graphical user interface (230). The "Create Message" function (250) is used to compose, by means of an editor, the mails and the distribution lists. This function has access to directories (255) stored on a local or a remote MTA, or to directories directly on a Local Address Book (257) (which is the local space of the user). The "Submit Message" function (250) translates a message to be compliant with the "Internet Message Format" RFC2822. The SMTP Stack (260) receives the message formatted by the "Submit Message" function. This formatted message is ready to be submitted to the MTA via SMTP.

The "Read/Retrieve Messages" function (240) is used to have access to the messages stored in the Mailbox (220). The protocols (265) used to access the mail box may be either the Post Office Protocol POP3, as described in the RFC 1939 and updated by the RFC 1957 and the RFC 2449, or the Internet Message Access Protocol IMAP4 as described in the RFC 3501. The "Attach/Detach" function (270) allows to attach a file to an e-mail or detach a file from an e-mail. A local database (275) allows to record a Folder/Directory linking table to be used by the method of the present invention. The local database may be indifferently replicated on the mail server to which the user belongs. The "Graphical User Interface" GUI (230) is provided to interact with the user.

FIG. 3 illustrates the general structure of a Folder/Directory linking table 300 (FolDir in short) organized as a matrix to automatically and dynamically link the folders structure on the user workstation to the directory structure. The table is made of a plurality of records (303), each representing the current link existing between a folder (column 301) and a directory (row 302). The table is automatically updated each time the user initiates an attach or a detach operation. As shown on the figure, the columns 301 of the table designate the folders of the user mail system and denoted as 'Folder #i' while the rows 302 designate the disk directories and denoted as 'Directory #j'. Each cell of the matrix denoted 'FolDir(i,j)' relates to a mail folder (the respective column) and to a disk directory (the respective row) and shows how many times the user has associated the respective mail folder and the respective disk directories for attaching or detaching a file.

The matrix is updated each time a user starts an attach or a detach operation (as will be detailed with reference to FIGS. 4 and 5) to attach or detach a file to/from a disk directory and save a mail into a folder. The process then allows to record a couple 'mail folder, disk directory' and to update the appropriate cell (303) in the FolDir table. To illustrate, for instance, a user wishes to save a file into a disk directory named 'c:\data\budget' and a corresponding mail into a mail folder named 'Budget'. If a column was previously created for the folder 'Budget' and a row already created for the directory 'c:\data\budget', then the content of the existing cell is incremented by 1. If either the folder or the directory has not already been created, then the corresponding column and/or row are built and the content of the related cell is set equal to 1.

In operation, once a user detaches or attaches a file and therefore calls for the attachment/detachment operation, the process allows to search automatically the matrix to look for disk directories that are the most often used for the mail folder where the corresponding mail is stored.

A browse directory dialog box displays automatically the more relevant disk directory or a list of potential directories candidates. The list may be limited to a maximum number of directories and defined by the user in a user preference dialog box.

If no disk directory has been found for the mail folder, then a default directory is proposed in a usual way, such as proposing the last one used for most of the electronic mail systems. The user may then select the proposed or default directory or may also browse the directory structure to select another one. Once the directory selected, the matrix is updated accordingly.

Figure 4:
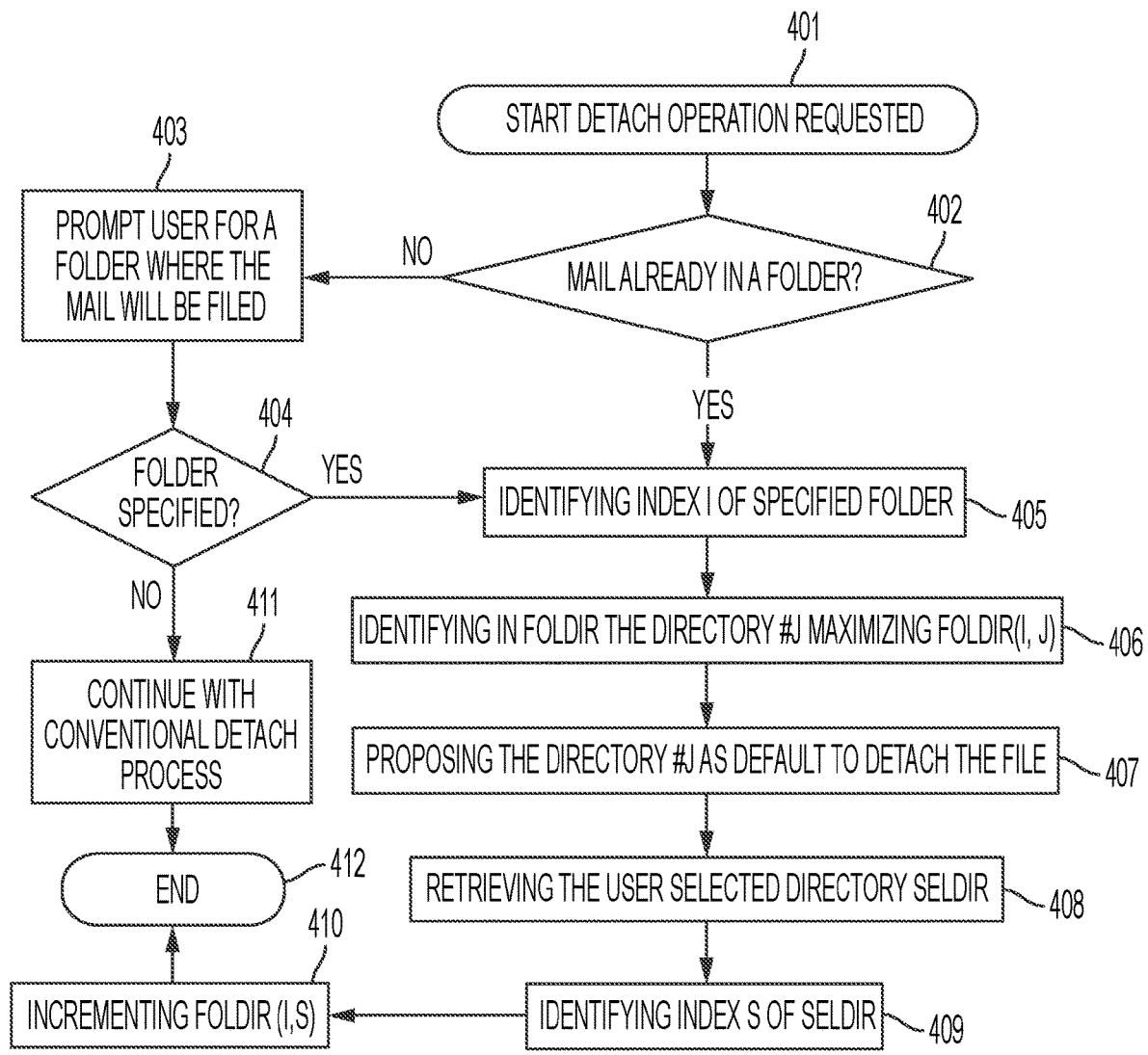
FIG. 4 illustrates a detailed flowchart of a detaching operation according to a preferred embodiment.

Referring now to FIG. 4, the steps for processing a detach operation according to a preferred embodiment of the invention are described. At step 401, the method starts on receiving a detach request from the user. At step 402, a test is performed to determine if the mail is already in a mail folder. If it is the case (branch Yes), then control is given to step 405, otherwise (branch No) control is given to step 403. At step 403, the user is prompted to specify a name folder where the mail is to be filed. Next, at step 404, a test is performed to determine if the user has specified a mail folder or not. If it is the case (branch Yes), then control is given to step 405, otherwise (branch no) control is given to step 411.

At step 411, the standard process as implemented in the mail client is used to detach the attachment the process ends on step 412. Referring to step 405, the FolDir table 300 is searched by the folder name to determine which index '#i' corresponds to the mail folder specified either at step 402 or at step 404. At next step 406, the respective folder column of the found folder index '#i' is scanned to determine which record 'Foldir(i,j)' is maximized, and point to the corresponding directory '#j'. Then, at step 407, the directory previously found is proposed to the user as a default directory for detaching the file. At step 408, the directory finally selected by the user for detaching the file is retrieved to initialize a local variable 'SelDir'. At step 409, the FolDir table 300 is scanned to determine the index '#s' corresponding to the variable 'SelDir'. At step 410, the content of the record holding the value Foldir(i,s) is incremented by one, and the detach process ends at step 412.

Figure 5:
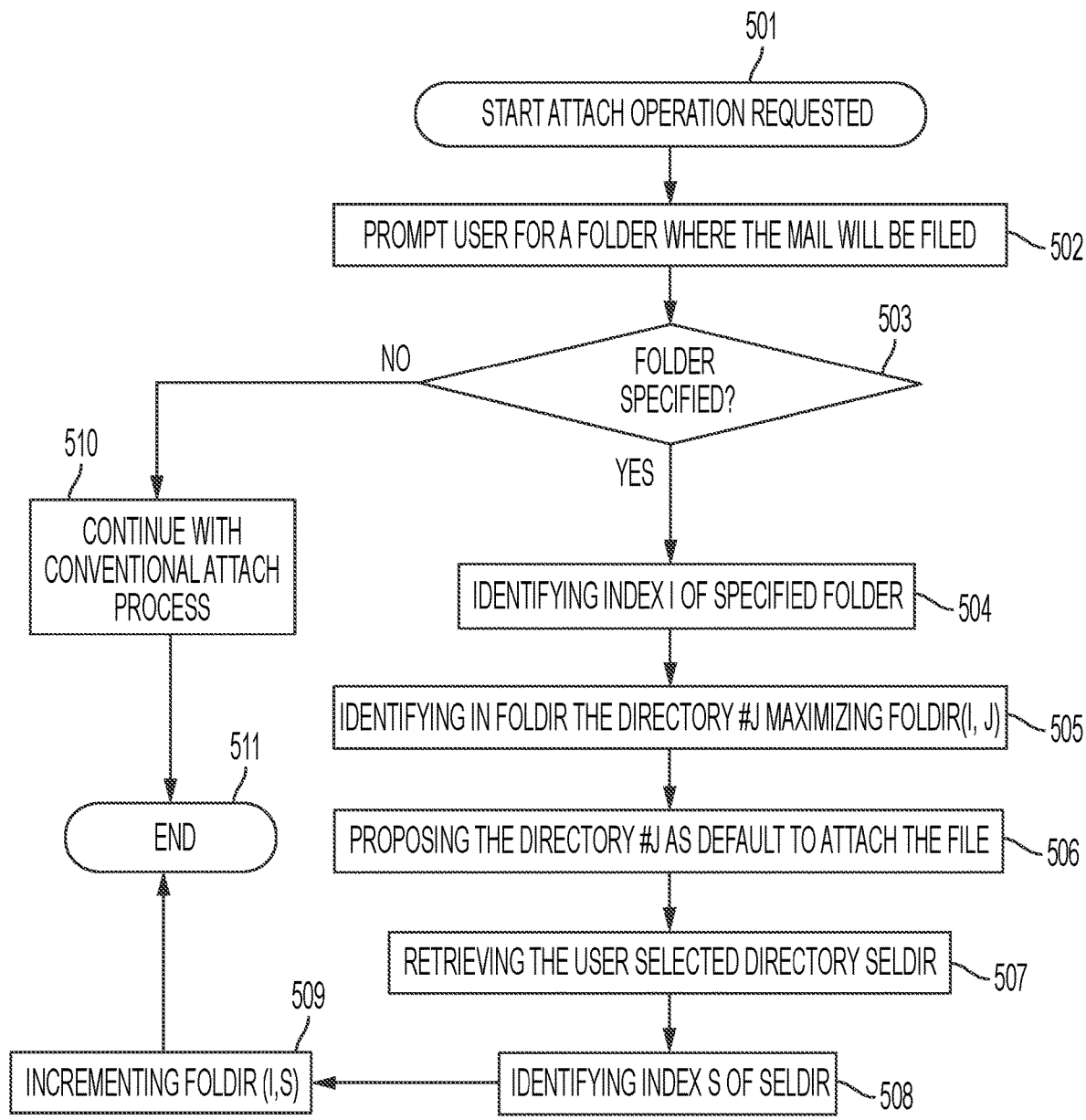
FIG. 5 illustrates a detailed flowchart of an attaching operation according to a preferred embodiment.

Referring now to FIG. 5, the steps for processing an attach operation according to a preferred embodiment of the invention are described. At step 501, the method starts on receiving an attach request from the user. At step 502, the user is prompted to specify a name of a folder where the mail that is to be sent is to be saved. At step 503, a test is performed to determine if the user has specified a mail folder or not. If it is the case (branch Yes), then control is given to step 504, otherwise (branch no) control is given to step 510. At step 510, the standard process as implemented in the mail client is used to attach the attachment the process ends at step 511.

Returning to step 504, the FolDir table 300 is searched by the folder name to determine which index '#i' corresponds to the mail folder specified at step 503. At next step 505, the respective folder column of the found folder index '#i' is scanned to determine which record 'FolDir(i,j)' is maximized, and point to the corresponding directory '#j'. Then, at step 506, the directory previously found is proposed to the user as the default directory for attaching the file. At step 507, the directory finally selected by the user for attaching the file is retrieved to initialize the local variable 'SelDir'. At step 508, the FolDir table 300 is scanned to determine the index 'Ts' corresponding to the variable 'SelDir'. At step 509, the content of the record holding the value Foldir(i,s), is incremented by one, and the attach process ends at step 511.

Figure 6A:
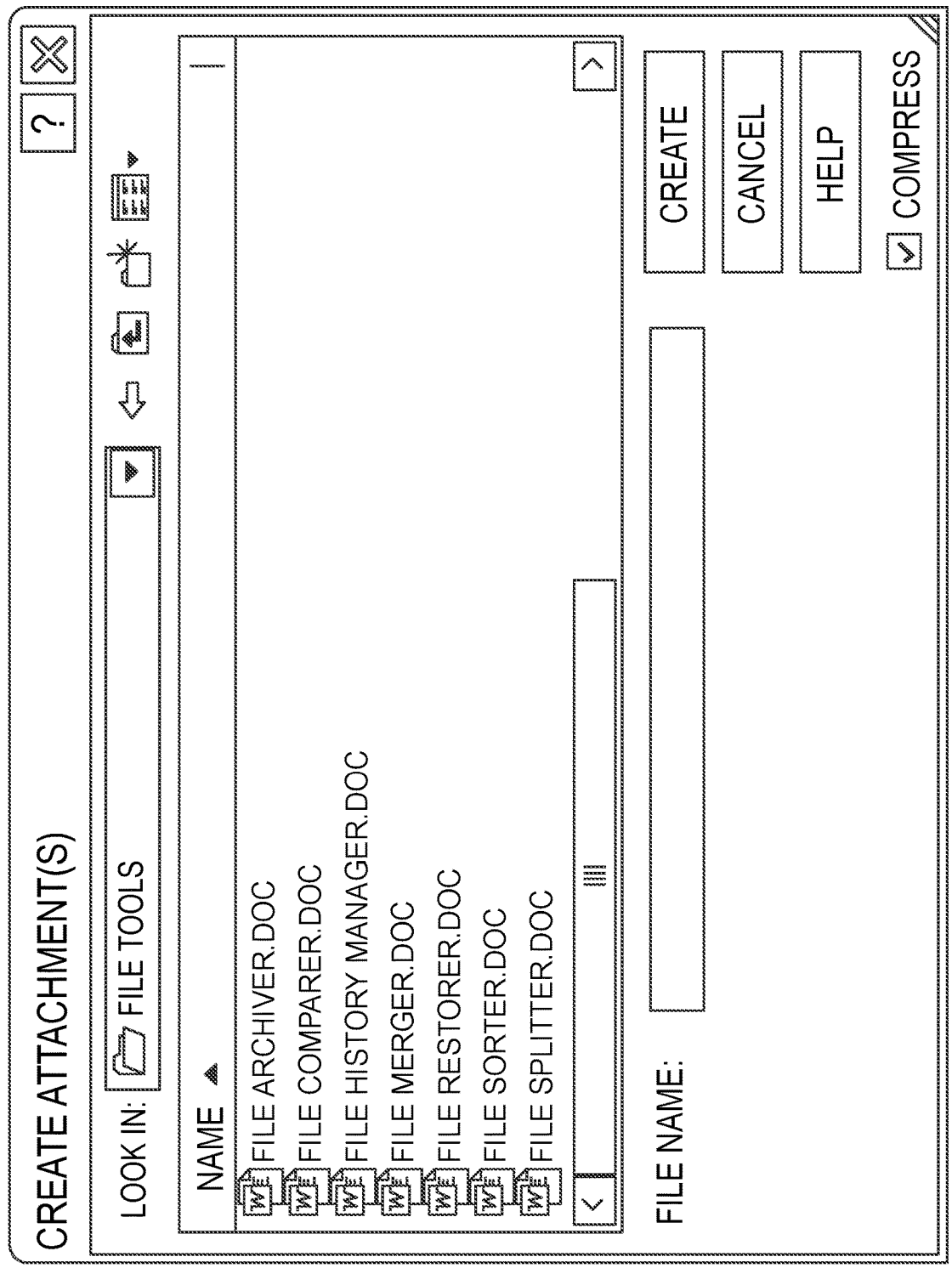
Figure 6B:
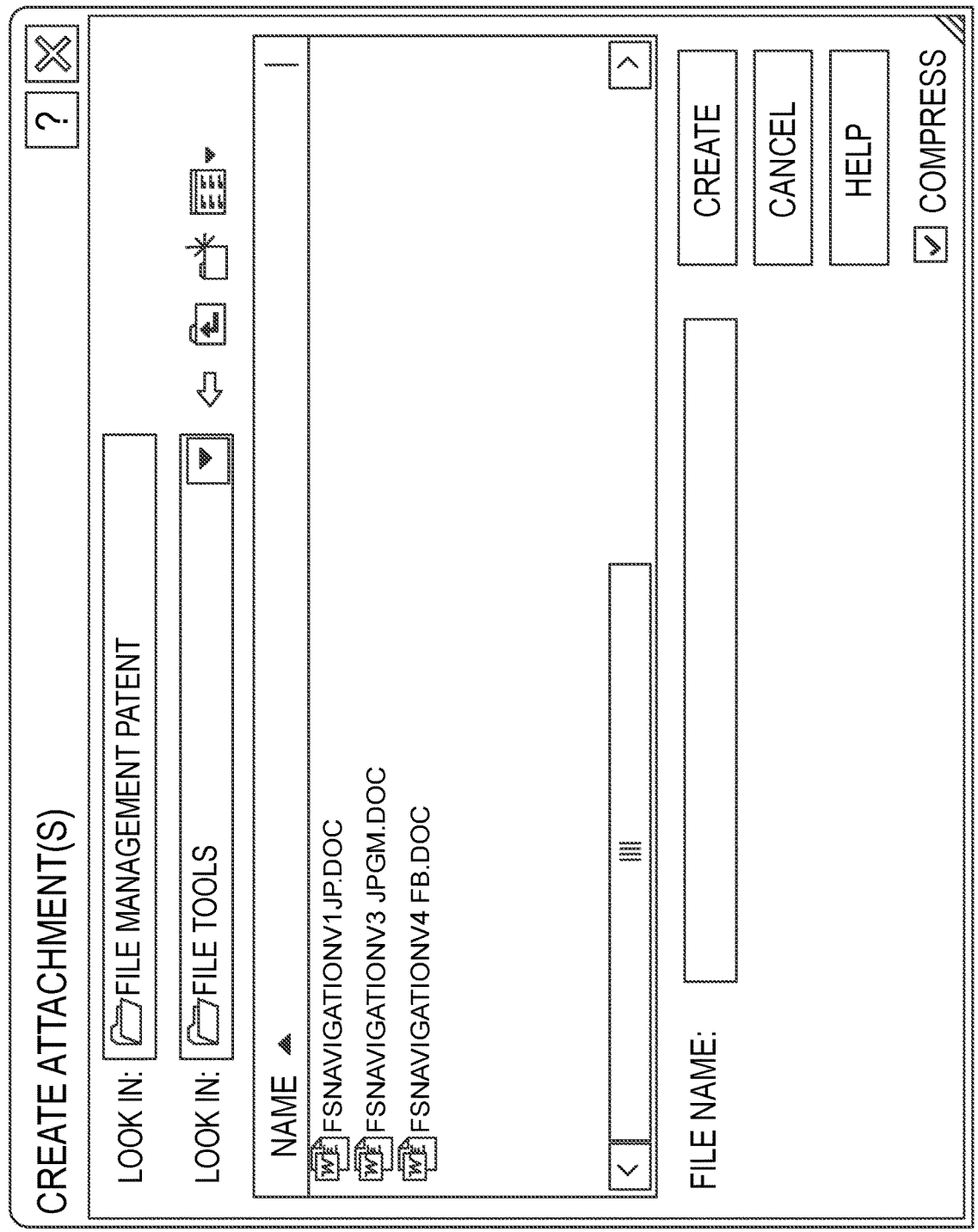
FIG. 6b shows a user interface taking advantage of the present invention.

Referring now to FIG. 6a and FIG. 6b, a user interface is shown to compare a standard view on FIG. 6a of a file directory proposal to the view as proposed by the present invention on FIG. 6b. More particularly, FIG. 6a shows a well-known user interface display where the last directory used is proposed. In this specific example, the directory is named "File Tools" and is proposed as being the most recently one used in an attach or a detach operation.

FIG. 6b shows a user interface display which takes advantage of the present invention by proposing on top of the regular default directory, another specific directory, based on the folder where the current mail resides. In this example the directory is named "File Management PATENT" and is proposed as being the most relevant one, on top of the directory named "File Tools" which was in this case the most recently used in a detach or an attach operation.

The person skilled in the art will easily modify the user interface of FIG. 6b to the case of more than a single directory is proposed to the user during an attach or a detach operation. In this case, the user interface as illustrated on FIG. 6b is adapted accordingly to show a list of several directories proposed as being the most relevant ones, on top of the default directory.

Each record of the FolDir table 300 may contain a computed value 'v' that represents a weighting factor of the recent use of the respective directory plus a time-stamped value 't' representing the date/time of the last update. When 'v' is incremented at a time T>t, the new value is calculated according to the following formula:

$$v = v\ \text{Exp}(a(t-T))+1$$

wherein 'a' is a parameter that quantifies the system memory such as the value of 'a' renders the old recorded information less important as regard to the more recent recorded ones.

It has to be appreciated that while the invention has been particularly shown and described with reference to a preferred embodiment, various changes in form and detail may be made therein without departing from the spirit, and scope of the invention, as illustrated in the following alternate embodiments.

What is claimed is:

1. A method of detaching a file attached to an electronic mail, the method comprising:
   maintaining a mail-attachment connection table listing a plurality of folders for storing electronic mails; and for each of the plurality of folders, listing a plurality of directories for storing attachments to the electronic mails stored in the each folder;
   receiving a request from a user to detach a file attached to a specified electronic mail;
   performing a test to determine if the specified electronic mail is stored in one of the folders;
   when the specified electronic mail is stored in one of the folders, searching the mail-attachment connection table for said one of the folders, scanning the list of directories for said one of the folders for determining one of the directories to store the file attached to the specified electronic mail, and
   storing the file attached to the specified electronic mail in the determined one of the directories; and
   when the specified electronic mail is not stored in any of the folders, selecting one of the folders for storing the file attached to the specified electronic mail, searching the mail-attachment connection table for said selected one of the folders, scanning the list of directories for said selected one of the folders for identifying one of the file attached to the specified electronic mail in the identified one of the directories.

2. The method according to claim 1, wherein the selecting one of the folders for storing the file attached to the specified electronic mail includes receiving input from the user for selecting said selected one of the folders.

3. The method according to claim 1, wherein the selecting one of the folders for storing the file attached to the specified electronic mail includes prompting the user to identifying one of the folders for storing the specified electronic mail.

4. The method according to claim 3, wherein the selecting one of the folders for storing the file attached to the specified electronic mail further includes testing to determine if the user has identified one of the folders for storing the specified electronic mail.

5. The method according to claim 4, wherein when the user has identified one of the folders for storing the specified electronic mail, using the identified one of the folders as the selected one of the folders.

6. The method according to claim 5, wherein when the user has not identified one of the folders for storing the specified electronic mail, implementing a process to detach the file from the specified electronic mail.

7. The method according to claim 1, further comprising maintaining a count of a number of times files attached to electronic mails are stored in each of the directories listed for each of the folders.

8. The method according to claim 7, wherein the scanning the list of directories for said one of the folders for determining one of the directories to store the file attached to the specified electronic mail includes determining said one of the directories based on the counts of the number of times files attached to electronic mails are stored in each of the directories listed for each of the folders.

9. The method according to claim 7, further comprising, after storing the file attached to the specified electronic mail in the determined one of the directories, incrementing the count of the number of times files attached to electronic mails are stored in the determined one of the directories.

10. The method according to claim 1, wherein the scanning the list of directories for said one of the folders for determining one of the directories to store the file attached to the specified electronic mail includes displaying to the user one or more of the directories, and the user selecting one of the displayed directories to store the file attached to the specified electronic mail.

11. A system for detaching a file attached to an electronic mail, comprising:
    one or more processor units configured for:
       maintaining a mail-attachment connection table listing a plurality of folders for storing electronic mails; and for each of the plurality of folders, listing a plurality of directories for storing attachments to the electronic mails stored in the each folder;
       receiving a request from a user to detach a file attached to a specified electronic mail;
       performing a test to determine if the specified electronic mail is stored in one of the folders;
       when the specified electronic mail is stored in one of the folders, searching the mail-attachment connection table for said one of the folders, scanning the list of directories for said one of the folders for determining one of the directories to store the file attached to the specified electronic mail, and storing the file attached to the specified electronic mail in the determined one of the directories; and
       when the specified electronic mail is not stored in any of the folders, selecting one of the folders for storing the file attached to the specified electronic mail, searching the mail-attachment connection table for said selected one of the folders, scanning the list of directories for said selected one of the folders for identifying one of the file attached to the specified electronic mail in the identified one of the directories.

12. The system according to claim 11, wherein the selecting one of the folders for storing the file attached to the specified electronic mail includes receiving input from the user for selecting said selected one of the folders.

13. The system according to claim 11, wherein the selecting one of the folders for storing the file attached to the specified electronic mail includes prompting the user to identifying one of the folders for storing the specified electronic mail.

14. The system according to claim 13, wherein the selecting one of the folders for storing the file attached to the specified electronic mail further includes testing to determine if the user has identified one of the folders for storing the specified electronic mail.

15. The system according to claim 14, wherein when the user has identified one of the folders for storing the specified electronic mail, using the identified one of the folders as the selected one of the folders.

16. A computer readable storage medium, tangibly embodying a program of instructions executable by a computer to perform a method for detaching a file attached to an electronic mail, the method comprising:

maintaining a mail-attachment connection table listing a plurality of folders for storing electronic mails; and for each of the plurality of folders, listing a plurality of directories for storing attachments to the electronic mails stored in the each folder;

receiving a request from a user to detach a file attached to a specified electronic mail;

performing a test to determine if the specified electronic mail is stored in one of the folders;

when the specified electronic mail is stored in one of the folders, searching the mail-attachment connection table for said one of the folders, scanning the list of directories for said one of the folders for determining one of the directories to store the file attached to the specified electronic mail, and storing the file attached to the specified electronic mail in the determined one of the directories; and when the specified electronic mail is not stored in any of the folders, selecting one of the folders for storing the file attached to the specified electronic mail, searching the mail-attachment connection table for said selected one of the folders, scanning the list of directories for said selected one of the folders for identifying one of the file attached to the specified electronic mail in the identified one of the directories.

17. The computer readable storage medium according to claim 16, wherein the selecting one of the folders for storing the file attached to the specified electronic mail includes receiving input from the user for selecting said selected one of the folders.

18. The computer readable storage medium according to claim 16, wherein the selecting one of the folders for storing the file attached to the specified electronic mail includes prompting the user to identifying one of the folders for storing the specified electronic mail.

19. The computer readable storage medium according to claim 18, wherein the selecting one of the folders for storing the file attached to the specified electronic mail further includes testing to determine if the user has identified one of the folders for storing the specified electronic mail.

20. The computer readable storage medium according to claim 19, wherein when the user has identified one of the folders for storing the specified electronic mail, using the identified one of the folders as the selected one of the folders.

\* \* \* \* \*